(12) United States Patent
Wann

(10) Patent No.: US 11,130,086 B2
(45) Date of Patent: Sep. 28, 2021

(54) NO RAMP LIFT RAILS FOR VERTICALLY ORIENTED DUST COLLECTOR CARTRIDGES

(71) Applicant: Imperial Systems, Inc., Mercer, PA (US)

(72) Inventor: Jeremiah Wann, Mercer, PA (US)

(73) Assignee: Imperial Systems, Inc., Mercer, PA (US)

( * ) Notice: Subject to any disclaimer, the term of this patent is extended or adjusted under 35 U.S.C. 154(b) by 226 days.

(21) Appl. No.: 16/538,127

(22) Filed: Aug. 12, 2019

(65) Prior Publication Data

US 2020/0047100 A1 Feb. 13, 2020

Related U.S. Application Data

(60) Provisional application No. 62/717,306, filed on Aug. 10, 2018.

(51) Int. Cl.
*B01D 46/00* (2006.01)
*B01D 46/24* (2006.01)
*B01D 46/52* (2006.01)

(52) U.S. Cl.
CPC ....... *B01D 46/0005* (2013.01); *B01D 46/002* (2013.01); *B01D 46/008* (2013.01); *B01D 46/0009* (2013.01); *B01D 46/2411* (2013.01); *B01D 46/2414* (2013.01); *B01D 46/521* (2013.01); *B01D 2265/06* (2013.01)

(58) Field of Classification Search
CPC ............ B01D 46/0009; B01D 46/0005; B01D 46/002; B01D 46/008; B01D 46/2411; B01D 46/2414; B01D 2265/06; B01D 2265/026
See application file for complete search history.

(56) References Cited

U.S. PATENT DOCUMENTS

| | | | | |
|---|---|---|---|---|
| 4,322,231 A * | 3/1982 | Hilzendeger | ...... | B01D 46/0005 55/357 |
| 5,599,364 A * | 2/1997 | Hawkins | .............. | B01D 46/002 55/378 |
| 5,665,145 A * | 9/1997 | Goodman | .......... | B01D 46/0013 55/471 |
| 5,961,696 A * | 10/1999 | Gombos | ............ | B01D 46/0005 55/493 |
| 6,358,292 B1 * | 3/2002 | Clements | .......... | B01D 46/0005 55/379 |
| 6,613,115 B2 * | 9/2003 | Moore | ............... | B01D 46/0005 55/283 |
| 8,673,037 B2 * | 3/2014 | Morgan | ............. | B01D 46/0005 55/341.1 |
| 9,174,155 B2 * | 11/2015 | Morgan | ............. | B01D 46/2414 |

* cited by examiner

*Primary Examiner* — Robert Clemente
(74) *Attorney, Agent, or Firm* — Jonathan M. D'Silva; MMI Intellectual Property

(57) ABSTRACT

A vertically oriented dust collector configured to filter dry particulate matter from an air stream comprises a housing containing at least one cartridge. Each cartridge comprises a filter pan having an opening and a filter incorporated into the opening. The housing further comprises at least one pair of rails oriented parallel to each other within the housing onto which each cartridge is mounted. Each rail is U-shaped with the opening of the U-shape oriented towards each other such that each pair of rails is configured to receive one filter pan between them.

2 Claims, 5 Drawing Sheets

NO RAMP LIFT RAILS FOR VERTICALLY ORIENTED DUST COLLECTOR CARTRIDGES

BACKGROUND

Manufacturing and industrial systems have robust systems for the processing of air, to remove dust, improve air quality, increase worker safety, etc. These systems typically include filter systems that collect airborne particles from the air stream. The arrangement and configuration of these filters within the system are an important and essential step in the air handling and treatment.

SUMMARY

What is presented is a vertically oriented dust collector configured to filter dry particulate matter from an air stream comprising a housing containing at least one cartridge. Each cartridge comprises a filter pan and a filter. The housing further comprises at least one pair of rails oriented parallel to each other within the housing onto which each cartridge is mounted. Each rail is U-shaped with the opening of the U-shape oriented towards each other such that each pair of rails is configured to receive one filter pan between them.

Those skilled in the art will realize that this invention is capable of embodiments that are different from those shown and that details of the apparatus and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Figure 1:
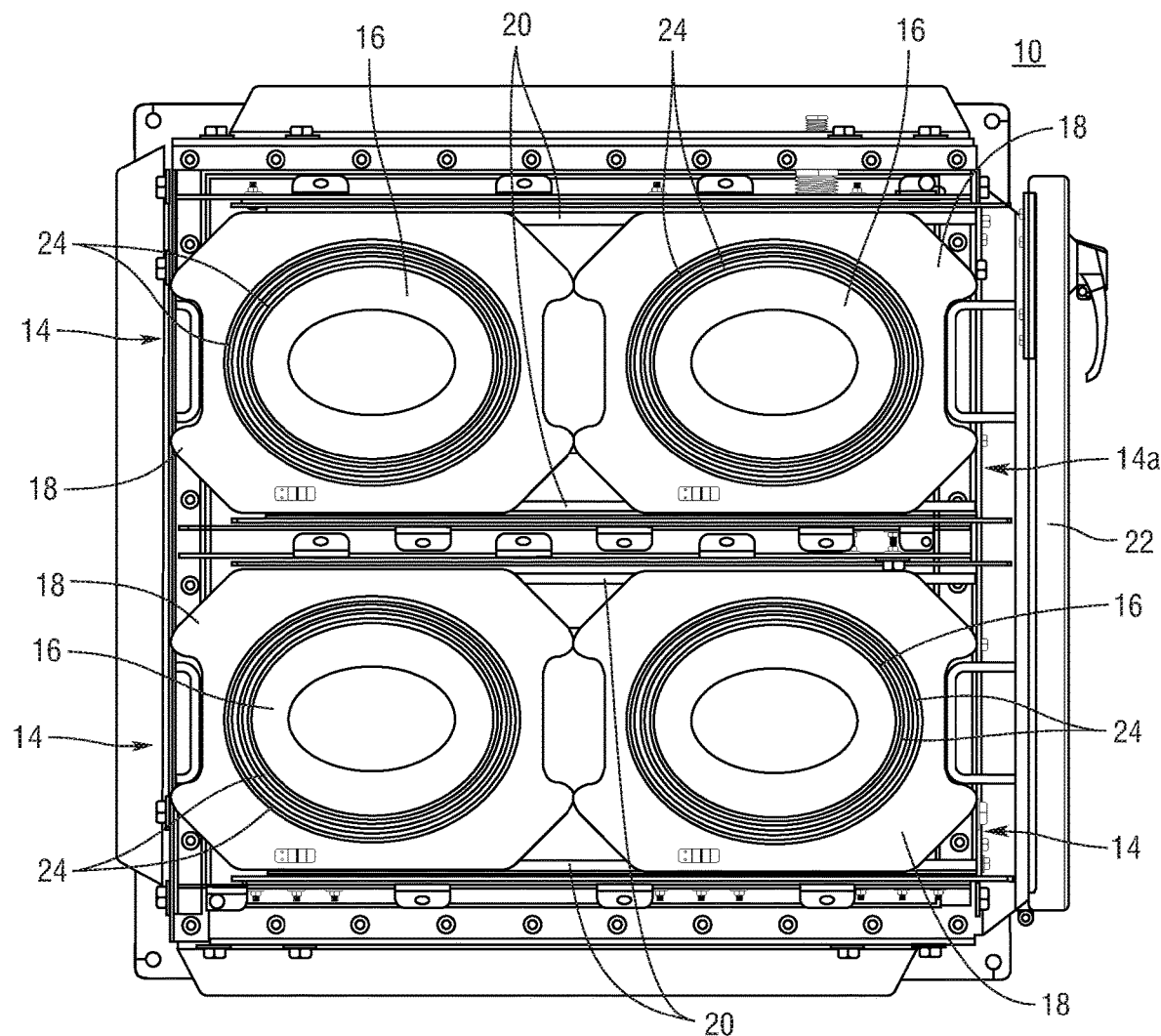
FIG. 1 is a top view of a prior art dust collector system.

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

Dust collectors are used to filter dust, fumes, and other airborne particles from air handling systems typically for industrial applications. FIGS. 1 through 4 show examples of prior art dust collectors 10. As best understood by comparing FIGS. 1 and 2, the dust collectors 10 comprise a housing 12 that is connected to the air flow path of an air handling system. The housing 12 contains at least one cartridge 14 that comprises a filter 16 mounted to a filter pan 18 that seats the filter 16 within the housing 12. The embodiment of dust collector 10 shown in FIG. 1 comprises four cartridges 14 within the housing 12 that are mounted on two pairs of rails 20 (also referred to as lift rails or cam bars) that raise and position the cartridges 14 within the housing 12. In this embodiment two pairs of rails 20 mount two cartridges 14 each. A door 22 provides access to the cartridges 14 to permit a user to lower the rails 20 and change out the cartridges 14 as needed.

The filter 16 is typically made of a pleated media folded into a shape that the air passes through. The cartridges 14 have gaskets 24 to create air-tight seals to ensure that the air flows through the filters 16. The cartridges 14 may be horizontally or vertically oriented and each type has different structural requirements for installation of the cartridges 14 into the housing 12.

Figure 2:
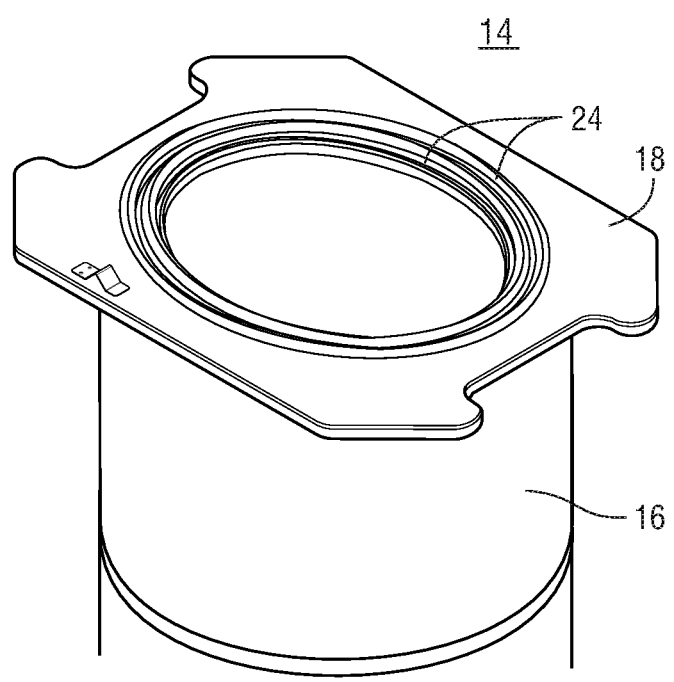
FIG. 2 is a perspective view of the upper portion of a prior art cartridge.
Figure 3:
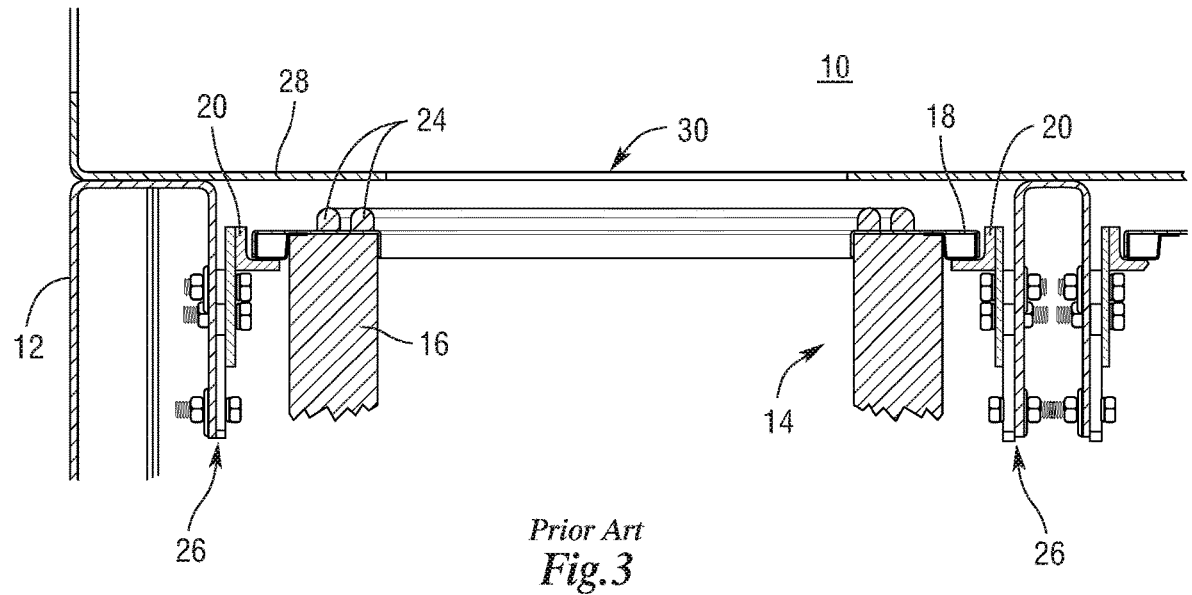
FIG. 3 is a cross section view of a cartridge in a housing with the rails in the lower position for installation of cartridges in the prior art.
Figure 4:
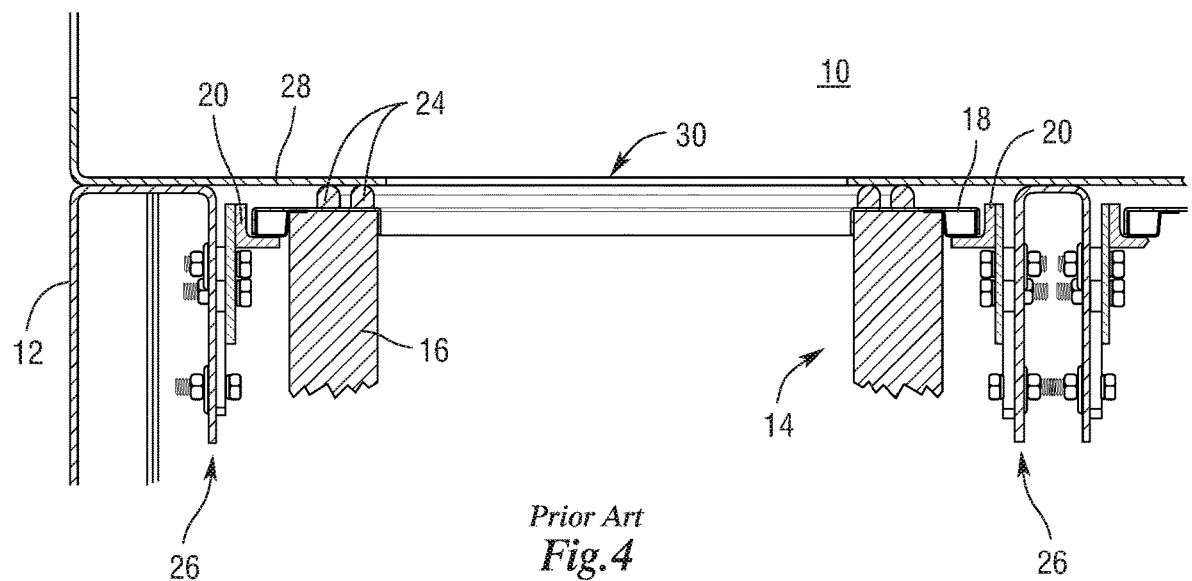
FIG. 4 is a cross section view of the cartridge in a housing of FIG. 3 with the rails in the upper position in which the cartridge is secured in the dust collector system in the prior art.

As best understood by comparing FIGS. 2, 3, and 4, it can be shown how cartridges 14 mounted to the rails 20 of the housing 20 and installed within the dust collectors 10. Each pair of rails 20 is mounted to a lever system 26. When a user opens the door 22, the user gains access to the lever system to lower the rails 20 to the position shown in FIG. 3. The cartridges 14 are located within the dust collector 10 housing 12 under an upper plate 28 which has a series of openings 30 that correspond to where the cartridges 14 must be located within the housing 12. With the rails 20 in the lower position, the user may remove and replace cartridges 14 as needed. New cartridges 14 are pushed back into place within the housing 12. The rails 20 are then raised as shown in FIG. 4 to push the gaskets 24 against upper plate 28 and form an airtight seal between the cartridge 14 and the upper plate 28.

Figure 5:
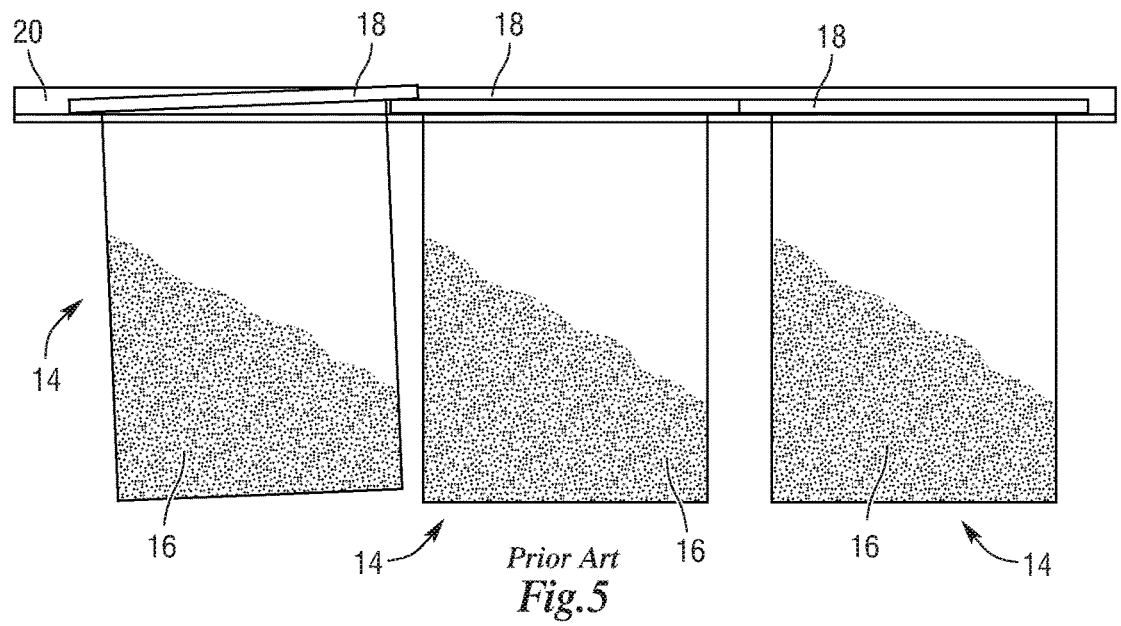
FIG. 5 is a side view of a series of cartridges installed on prior art rails showing cartridges ramping on each other.

In prior art dust collector systems like the ones shown in the figures, there is generally no way to be certain that the cartridges 14 are properly seated on the rails 20 especially if the user is careless in pushing the cartridges 14 into the housing. As shown in FIG. 5, cartridges 14 may ramp up over the cartridge 14 in front of it and the careless operator may not be aware of such misalignment. If the operator then attempts to raise the rails 20 as shown in FIG. 4, there is a risk that the operator may damage the filter pan 18.

Figure 6:
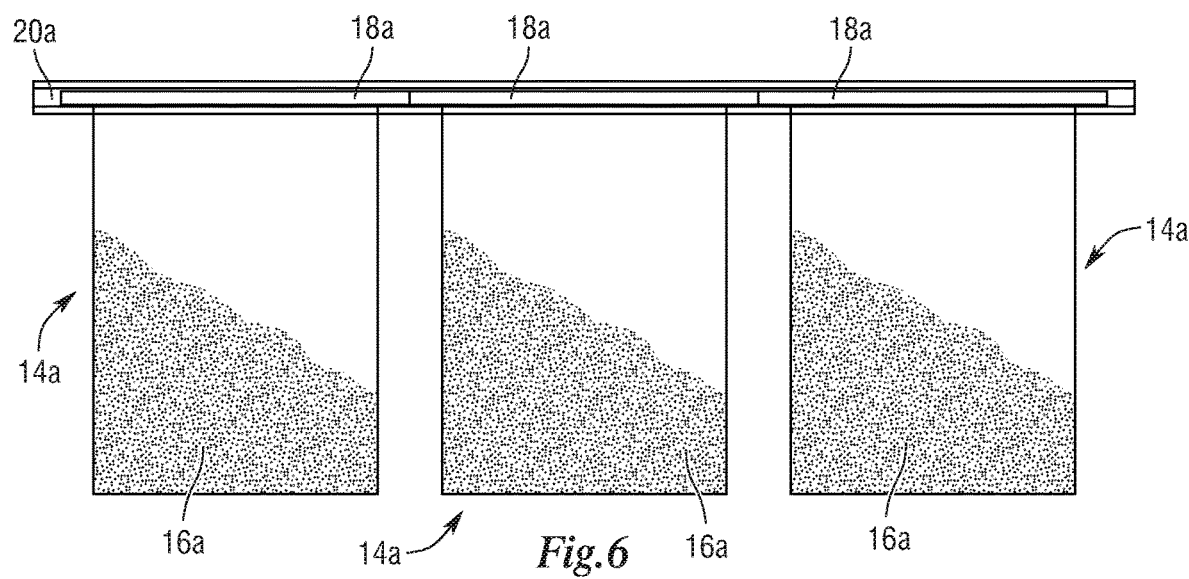
FIG. 6 is a side view of a series of cartridges installed on an embodiment of disclosed rails that prevent ramping.
Figure 7:
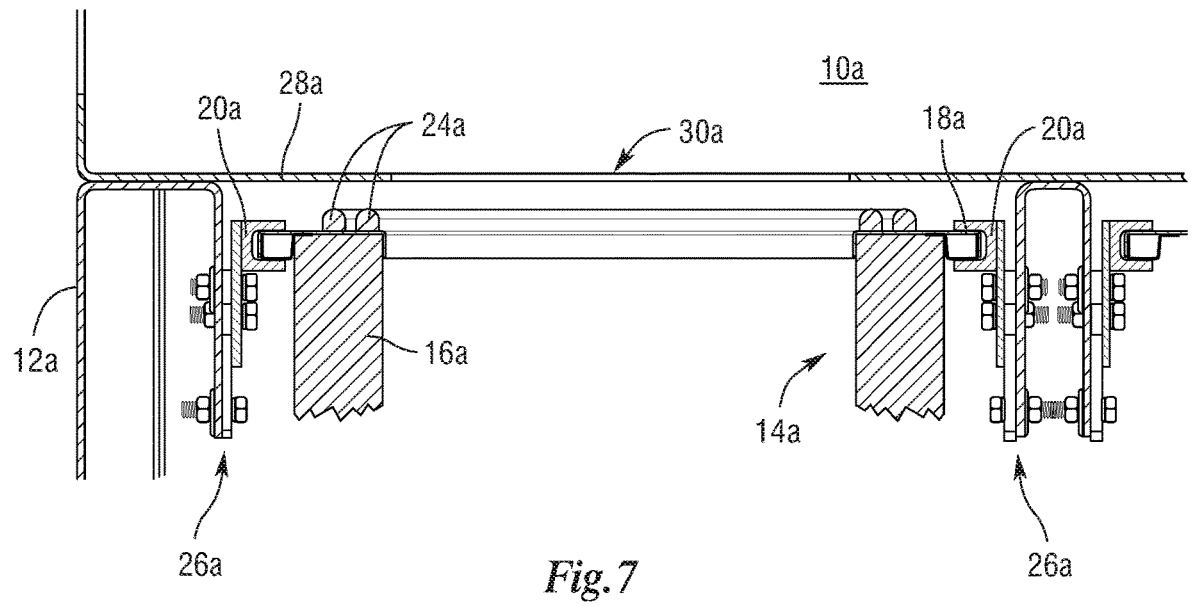
FIG. 7 is a cross section view of a cartridge in a housing with the rails in the lower position for installation of cartridges.
Figure 8:
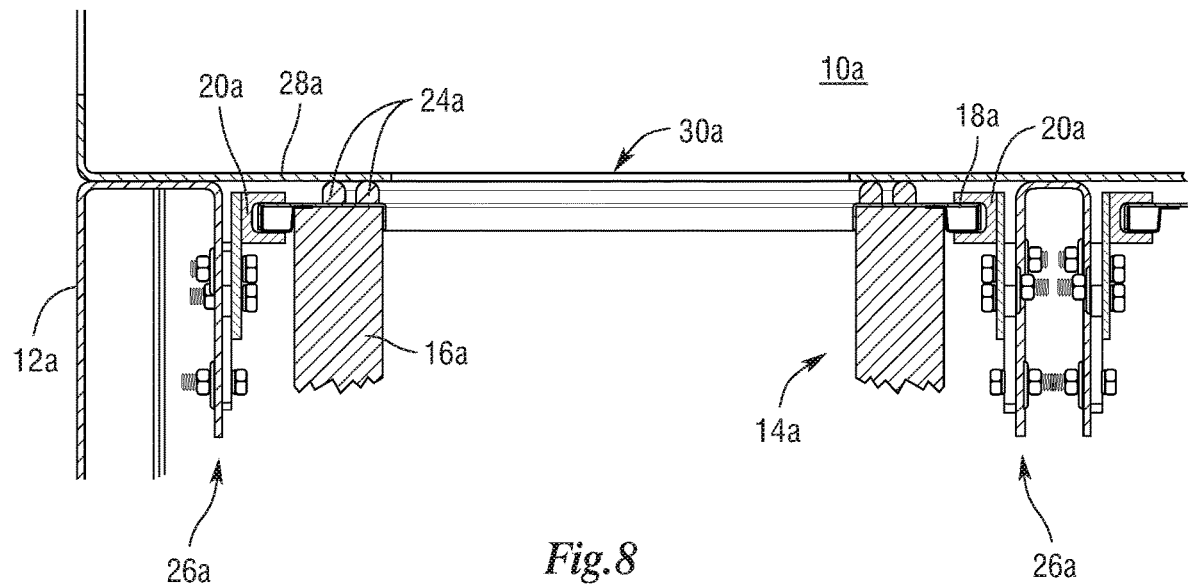
FIG. 8 is a cross section view of the cartridge in a housing of FIG. 7 with the rails in the upper position in which the cartridge is secured in the dust collector system.

FIGS. 6, 7, and 8 show a solution that prevents the cartridges 14a from ramping up against each other. The vertically oriented dust collector 10a is configured to filter dry particulate matter from an air stream. The housing 12a contains at least one cartridge 14a and each cartridge 14a comprises a filter pan 18a and a filter 16a. The housing 12a further comprises at least one pair of rails 20a oriented parallel to each other within the housing 12a onto which each cartridge 14a is mounted. Each rail 20a is U-shaped with the opening of the U-shape oriented towards each other such that each pair of rails 20a is configured to receive one filter pan 18a between them. The figures show how more than one cartridge 14a is mounted to each pair of rails 20a.

The U-shaped rails 20*a* prevent the cartridges 14*a* from lifting up when it presses up another cartridge 14*a* that is already in the housing 12*a*.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

What is claimed is:

1. A vertically oriented dust collector configured to filter dry particulate matter from an air stream comprising:
   a housing containing at least one cartridge;
   each said cartridge comprising:
      a filter pan; and
      a filter;
   said housing further comprising:
      at least one pair of rails oriented parallel to each other within said housing onto which each said cartridge is mounted, wherein each rail is U-shaped with the opening of said U-shape oriented towards each other such that each said pair of rails is configured to receive one said filter pan between them.

2. The vertically oriented dust collector of claim 1 further comprising more than one cartridge is mounted to each said pair of rails.

\* \* \* \* \*